United States Patent
Lee et al.

(10) Patent No.: US 8,345,849 B2
(45) Date of Patent: Jan. 1, 2013

(54) TELECOMMUNICATIONS ENDPOINT THAT PROMPTS A USER TO FOCUS ON A MONITORED CALL

(75) Inventors: Vandy Lee, Colts Neck, NJ (US); Emil F. Stefanacci, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 903 days.

(21) Appl. No.: 12/127,433

(22) Filed: May 27, 2008

(65) Prior Publication Data
US 2009/0296908 A1    Dec. 3, 2009

(51) Int. Cl.
*H04M 3/42* (2006.01)
(52) U.S. Cl. .................. 379/202.01; 379/88.01
(58) Field of Classification Search ........... 379/202.01, 379/205.01, 88.01, 88.02, 203.01, 204.01, 379/206.01
See application file for complete search history.

(56) References Cited

U.S. PATENT DOCUMENTS

| | | | | |
|---|---|---|---|---|
| 5,412,738 | A * | 5/1995 | Brunelli et al. | 382/115 |
| 7,003,092 | B1 * | 2/2006 | Lester et al. | 379/387.01 |
| 8,059,807 | B2 * | 11/2011 | Gilbert et al. | 379/202.01 |
| 2004/0184586 | A1 * | 9/2004 | Coles et al. | 379/88.14 |
| 2004/0228463 | A1 * | 11/2004 | Sauvage et al. | 379/202.01 |
| 2005/0138617 | A1 * | 6/2005 | Friedman | 717/174 |
| 2005/0207357 | A1 * | 9/2005 | Koga | 370/260 |
| 2008/0279366 | A1 * | 11/2008 | Lindbergh | 379/421 |
| 2009/0088224 | A1 * | 4/2009 | Le Gall et al. | 455/570 |
| 2009/0220065 | A1 * | 9/2009 | Ahuja et al. | 379/202.01 |

* cited by examiner

*Primary Examiner* — Quynh Nguyen
*Assistant Examiner* — Oleg Asanbayev
(74) *Attorney, Agent, or Firm* — Maldjian Law Group LLC; John P. Maldjian, Esq.; Alexander D. Walter, Esq.

(57) ABSTRACT

A telecommunications endpoint and method are disclosed that involve the monitoring of a conference call by the endpoint, on behalf of a call participant who is either at the endpoint or elsewhere, and the prompting of the participant when his/her presence is needed. The monitoring of the call involves determining whether certain phrases that are relevant to and initialized by the participating endpoint user are spoken during the call. Such phrases might comprise the user's name, the name of a relevant project, the name of a relevant work item, and so forth. At a point in the call when one of the phrases has been spoken, the endpoint prompts the user of the event and provides relevant information that enables the user to refocus attention towards the call.

13 Claims, 8 Drawing Sheets

TELECOMMUNICATIONS ENDPOINT THAT PROMPTS A USER TO FOCUS ON A MONITORED CALL

FILED OF THE INVENTION

The present invention relates to telecommunications in general, and, more particularly, to a telecommunications endpoint that monitors a call on behalf of an endpoint user and prompts the user to focus on the call when needed.

BACKGROUND OF THE INVENTION

Teleconferencing, at least in theory, can be an effective tool that involves the live exchange of information, particularly audio signals, among call participants. In reality, however, teleconferencing often ties up the participants for extended periods of time. Some of the participants often have to sit through an entire conference call, even though their presence is ultimately needed for only a portion of the call, and sometimes their presence is ultimately not even necessary. These participants often have to listen in to the entire conference call to know when it is their turn to speak, their prolonged wait wasting valuable time and productivity. Or, these participants only partially listen while multitasking on other work items, such as looking through email in their office, and often miss their cue to focus on the call and speak when requested to respond to something being discussed on the call.

SUMMARY OF THE INVENTION

The present invention comprises the monitoring of a conference call by a telecommunications endpoint, on behalf of a call participant who is either at the endpoint or elsewhere, and the prompting of the participant when his/her presence is needed. In accordance with the illustrative embodiment of the present invention, the monitoring of the call involves determining whether certain phrases that are relevant to and initialized by the participating endpoint user are spoken during the call. Such phrases might comprise the user's name, the name of a relevant project, the name of a relevant work item, and so forth. At a point in the call when one of the phrases has been spoken, the endpoint prompts the user of the event and provides relevant information that enables the user to refocus attention towards the call.

In the first example of the illustrative embodiment, the telecommunications endpoint monitors a conference call on behalf of its own user, who is a participant of the conference call, while the user is temporarily distracted from the conference call. The user might be distracted while involved in a "parallel activity" to the conference call. For example, endpoint 101-1's user might have another activity going on in her office, which prevents her from giving her undivided attention to the conference call. In accordance with the illustrative embodiment, the endpoint first initializes a set of user-specified spoken phrases to be monitored for during the conference call. The endpoint then joins the conference call. When its user invokes the feature, such as at the start of the call, the endpoint initializes the monitoring process by automatically muting its microphone and decreasing the volume level of its loudspeaker, and then starts to monitor the conference call for the spoken phrases initialized earlier. At this point, the endpoint is also recording the call and maintaining in its memory the most recent portion of the audio from the call, the audio portion to be used later.

Continuing with the first example, when one of the other participants speaks a stored phrase, or something similar, the endpoint alerts its user of the event, who is then able to focus—that is, concentrate her attention—on the conference call. In some embodiments, the alert comprises an indicium of the participant who spoke the stored phrase, thereby providing better context to the user. The endpoint automatically unmutes its microphone, increases the volume back to a normal listening level, and/or plays back the latest portion of audio from the call, in order to enable its user to focus more easily and to provide context of the alerted event to the user.

In a second example of the illustrative embodiment, the telecommunications endpoint monitors a conference call on behalf of a remote participant, who is using an endpoint in the prior art, while the remote participant is temporarily distracted from the conference call. The remote participant might be distracted while involved in a parallel activity to the conference call and presumably does not have the monitoring-and-prompting feature disclosed herein on his own phone. In accordance with the illustrative embodiment, the endpoint first initializes a set of user-specified spoken phrases to be monitored for during the conference call. The illustrative-embodiment endpoint then joins the conference call, as well as the prior-art endpoint of the remote participant. When the feature is subsequently invoked, the illustrative-embodiment endpoint initializes the monitoring process and then starts to monitor the conference call for the spoken phrases initialized earlier. When one of the participants speaks a stored phrase, or something similar, the endpoint alerts the remote participant of the event, possibly by transmitting a text message or other type of message to the remote endpoint, and the remote participant is then able to focus on the conference call.

The illustrative embodiment of the present invention is made possible by a voice recognition engine, which is becoming increasingly available on telecommunications endpoints. Advantageously, it is the telecommunications endpoint of the illustrative embodiment that provides the disclosed feature, instead of a centralized device such as a teleconference bridge, because the endpoint is able to provide the feature independently of any of the other endpoints or devices involved in the call.

The telecommunications endpoint of the illustrative embodiment of the present invention comprises: a microphone for receiving a first input audio signal from a first participant in a conference call; a network interface for receiving a second input audio signal from a second participant of the conference call at a second telecommunications endpoint; a processor for recognizing the first input audio signal as a first spoken phrase, for recognizing the second input audio signal as a second spoken phrase, and for determining whether the second spoken phrase is equivalent to the first spoken phrase; and alerting means for alerting one of the participants in the conference call other than the second participant, when the processor determines that the second spoken phrase is equivalent to the first spoken phrase.

DETAILED DESCRIPTION

Figure 1:
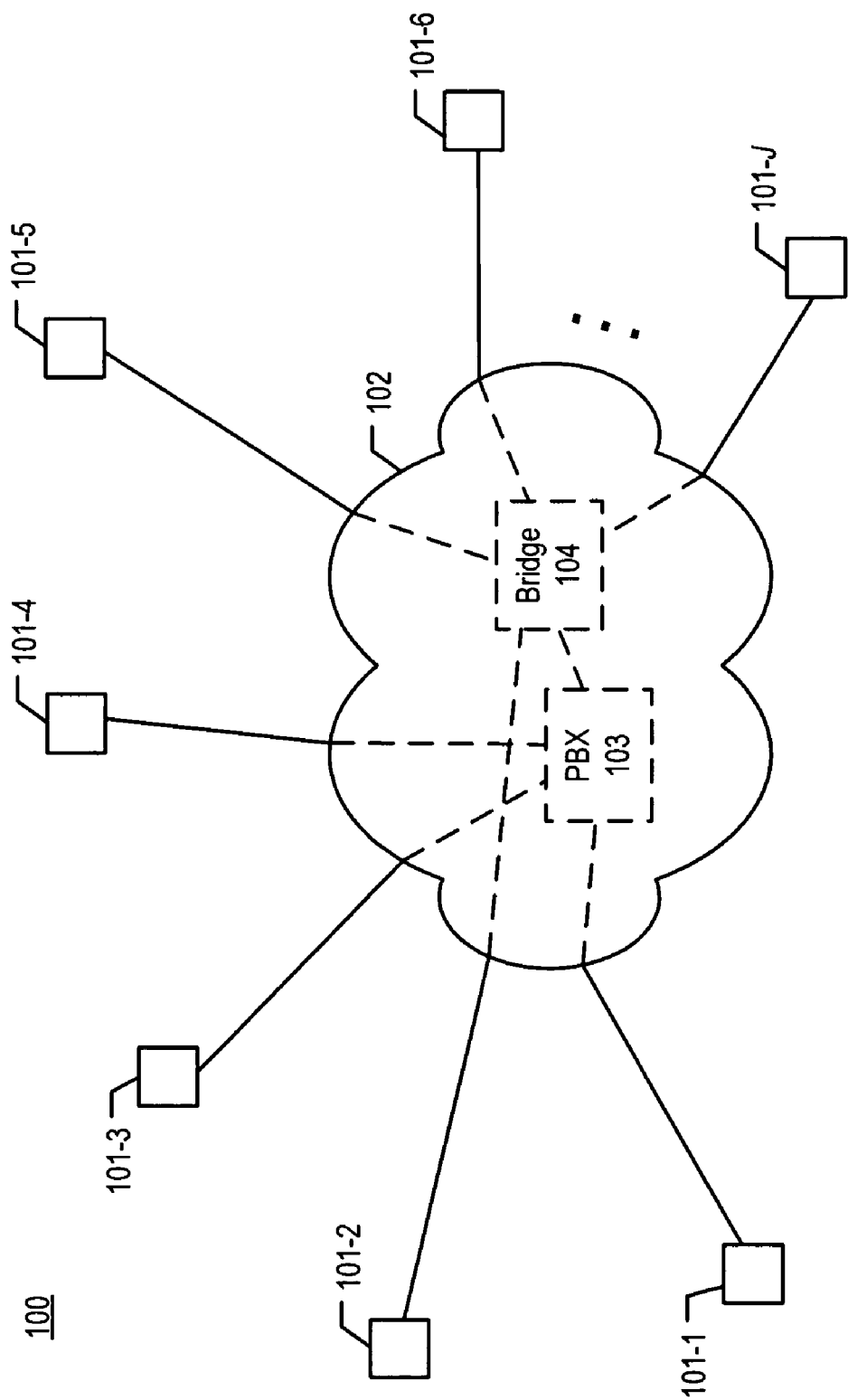
FIG. 1 depicts a schematic diagram of teleconference system 100 in accordance with the illustrative embodiment of the present invention.

FIG. 1 depicts a schematic diagram of teleconference system 100 in accordance with the illustrative embodiment of the present invention. System 100 comprises telecommunications endpoints 101-1 through 101-J, wherein J is an integer greater than one; telecommunications network 102; private branch exchange (PBX) 103; and teleconference bridge 104, interconnected as shown.

Telecommunications endpoint 101-$j$, where j has a value between 1 and J, inclusive, is a device that is capable of handling a telephone call for its user. Endpoint 101-$j$ can be a cellular phone, a conference phone (i.e., "speakerphone"), a deskset, a soft phone resident in a computer, or some other type of telecommunications appliance that is capable of exchanging voice signals. Endpoint 101-$j$ is able to call, or to be called by, another endpoint or device within teleconference system 100. For example, in order to participate in a conference call, endpoint 101-$j$ is able to dial a telephone number that routes to teleconference bridge 104.

Some of endpoints 101-1 through 101-J are endpoints that are tied to a private-branch exchange, such as desksets in an office enterprise network for which telecommunications service is enabled by private-branch exchange 103. For example, endpoints 101-1, 101-3, and 101-4 as depicted are PBX endpoints that route through PBX 103 in order to place or receive a call, such as a conference call that involves bridge 104.

Telecommunications endpoint 101-1, in particular, is capable of performing the tasks of the illustrative embodiment. The salient components of endpoint 101-1 that enable the performing of the tasks are described below and with respect to FIG. 2. The salient tasks that are performed by endpoint 101-1 are described below and with respect to FIGS. 3 through 8. It will be clear, however, those skilled in the art how to make and use embodiments of the present invention in which one or more endpoints other than endpoint 101-1 are capable of performing the tasks of the illustrative embodiment within the same or different conference calls.

Telecommunications network 102 provides the connectivity among endpoints 101-1 through 101-J, and enables the transport and control of communications signals between two or more endpoints per call. The communications signals convey bitstreams of encoded media, such as audio, video, and so forth. To this end, network 102 comprises one or more interconnected data-processing systems such as switches, servers, routers, and gateways, as are well-known in the art. For example, network 102 comprises private-branch exchange 103 and teleconference bridge 104.

In accordance with the illustrative embodiment, network 102 comprises an Internet Protocol-based (IP-based) network, as is known in art, for the purpose of transporting voice signals. Although network 102 in the illustrative embodiment comprises a Voice-over-IP (VoIP) service provider's network, network 102 could alternatively or additionally comprise another type of network such as the Internet, some other type of IP-based network, or some other type of packet-based network, such as the Public Switched Telephone Network, as those who are skilled in the art will appreciate.

Teleconference bridge 104 is a server or switch that enables the users of multiple endpoints to communicate with each other during a conference call, for one or more concurrent calls. Bridge 104 receives audio signals from endpoints that are participating on a conference call, mixes those signals together, and transmits the mixed signals back to the endpoints.

During operation, bridge 104 receives an audio feed from each endpoint, such as endpoint 101-1, adds the feeds, and distributes the sum back to endpoints 101-1 through 101-J. In the operation of bridge 104, the audio signal received by any endpoint 101-$j$ contains components of one or more other endpoints 101-$k$, k≠j, but explicitly excludes components of the signal sent to the bridge by endpoint 101-$j$. By doing so, bridge 104 prevents regenerative acoustic feedback that would otherwise occur.

Figure 2:
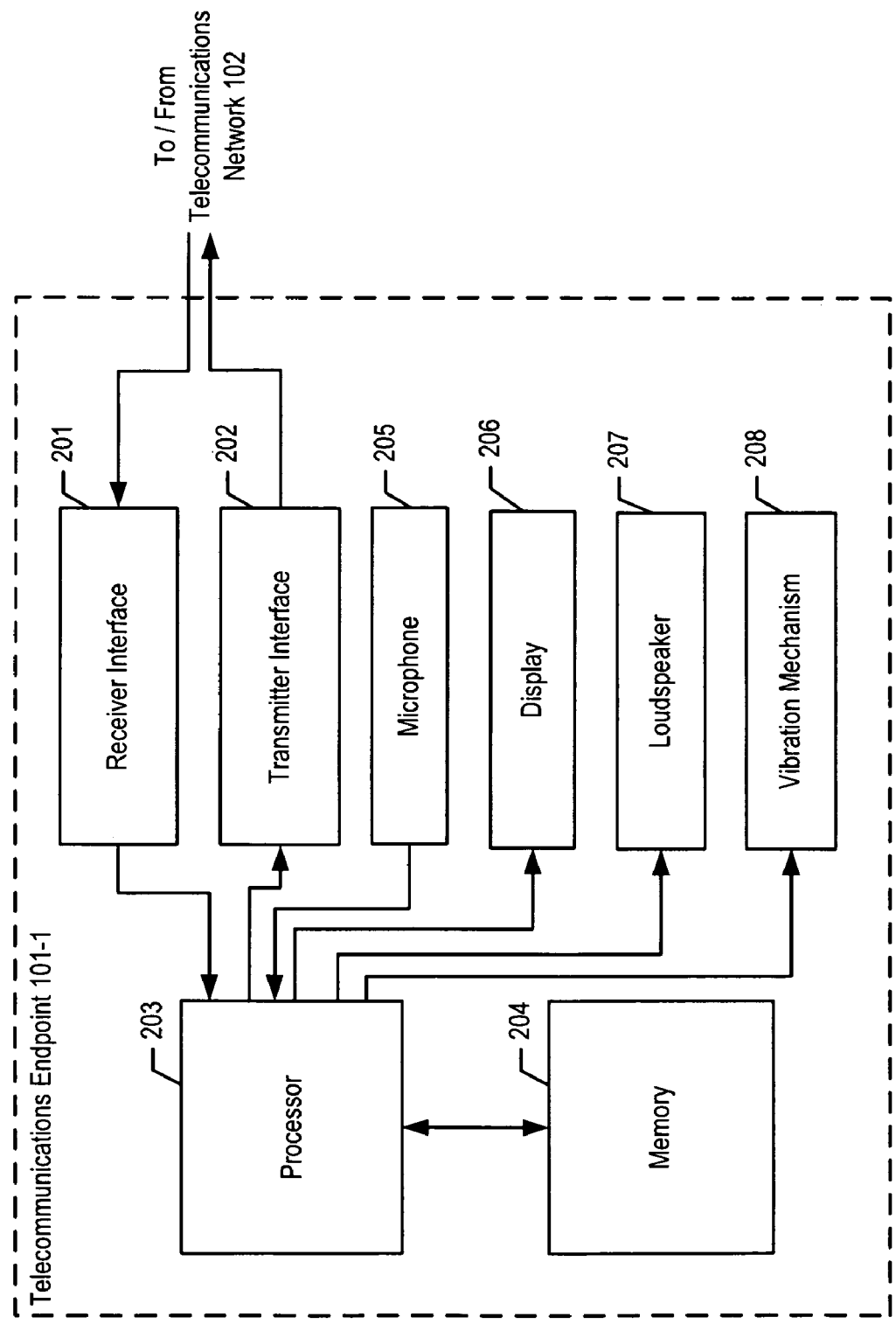
FIG. 2 is a block diagram of the salient components of telecommunications endpoint 101-1, which is part of system 100.

FIG. 2 is a block diagram of the salient components of telecommunications endpoint 101-1 in accordance with the illustrative embodiment of the present invention. The depicted components are interconnected as shown. In accordance with the illustrative embodiment, telecommunications endpoint 101-1 comprises:

i. receiver interface 201,
    ii. transmitter interface 202,
    iii. processor 203,
    iv. memory 204,
    v. microphone 205,
    vi. display 206,
    vii. loudspeaker 207, and
    viii. vibration mechanism 208.

It will be clear to those skilled in the art, after reading this disclosure, how to make and use alternative embodiments of the present invention in which telecommunications endpoint 101-1 comprises any subcombination of the components listed above.

Receiver interface 201 and transmitter interface 202 constitute the network interface that enables endpoint 101-1 to respectively receive signals from and transmit signals to network 102, in well-known fashion. In accordance with the illustrative embodiment, endpoint 101-1 receives and transmits media waveform signals in well-known fashion, such as audio signals that are encoded via the ITU G.729 standard (or other standard) and represented in Voice over Internet Protocol (VoIP) packet streams of data. As those who are skilled in the art will appreciate, in some alternative embodiments endpoint 101-1 receives and transmits media waveform signals that are encoded and/or represented in a different format.

Processor 203 is a general-purpose processor that is capable of receiving information from receiver interface 201 and microphone 205, of executing instructions stored in memory 204 such as those that correspond to some or all of the tasks of the illustrative embodiment, of reading data from and writing data into memory 204, and of transmitting information to transmitter interface 202. Additionally, processor 203 is able to provide signals to display 206, loudspeaker 207, and vibration mechanism 208. Processor 203 is also able to perform voice recognition on signals received from microphone 205 or on signals received from network interface receiver 201, or both.

In some alternative embodiments of the present invention, processor 203 might be a special-purpose processor. In some other alternative embodiments, the functionality performed by processor 203 might be divided up among multiple processors (e.g., one for voice recognition processing, another for general processing, etc.).

Memory 204 stores the instructions and data used by processor 203, in well-known fashion. Memory 204 can be any combination of dynamic random-access memory (RAM), flash memory, disk drive memory, and so forth. In accordance with the illustrative embodiment, memory 204 is further capable of storing the most recent T seconds (e.g., five seconds, etc.) of audio signal received from network 102, as recorded by processor 203.

Microphone 205 is a transducer that is able to receive acoustic signals and to convert them to electrical signals for transmission and/or storage. It will be clear to those skilled in the art how to make and use microphone 205.

Display 206 is part of the user interface of endpoint 101-1. In accordance with the illustrative embodiment, display 206 comprises a liquid crystal display that is able to present the endpoint's user with a visual representation of information. It will be clear to those skilled in the art how to make and use alternative embodiments of the present invention in which display 206 comprises other than a liquid crystal display.

Loudspeaker 207 is another part of the user interface of endpoint 101-1. In accordance with the illustrative embodiment, loudspeaker 207 is able to present the endpoint's user with an audible representation of information. As those who are skilled in the art will appreciate, in some alternative embodiments of endpoint 101-1, loudspeaker 207 can instead be a type of electro-acoustic transducer other than a loudspeaker, such as an earpiece. In any event, it will be clear to those skilled on the art how to make and use loudspeaker 207.

Vibration mechanism 208 is yet another part of the user interface of endpoint 101-1. In accordance with the illustrative embodiment, mechanism 208 is able to present the endpoint's user with a tactile representation of information. It will be clear to those skilled on the art how to make and use vibration mechanism 208.

In accordance with the illustrative embodiment, processor 203 of endpoint 101-1 performs the tasks described below and with respect to FIGS. 3 through 8. As those who are skilled in the art will appreciate, in some alternative embodiments, two or more components within endpoint 101-1 can perform different subsets of the described tasks.

FIGS. 3 through 8 depict flowcharts of the salient tasks performed by telecommunications endpoint 101-1, in accordance with the illustrative embodiment of the present invention. As those who are skilled in the art will appreciate, in some alternative embodiments, only a subset of the depicted tasks are performed, while at least some of performed tasks might be performed simultaneously or in a different order from that depicted.

Figure 3:
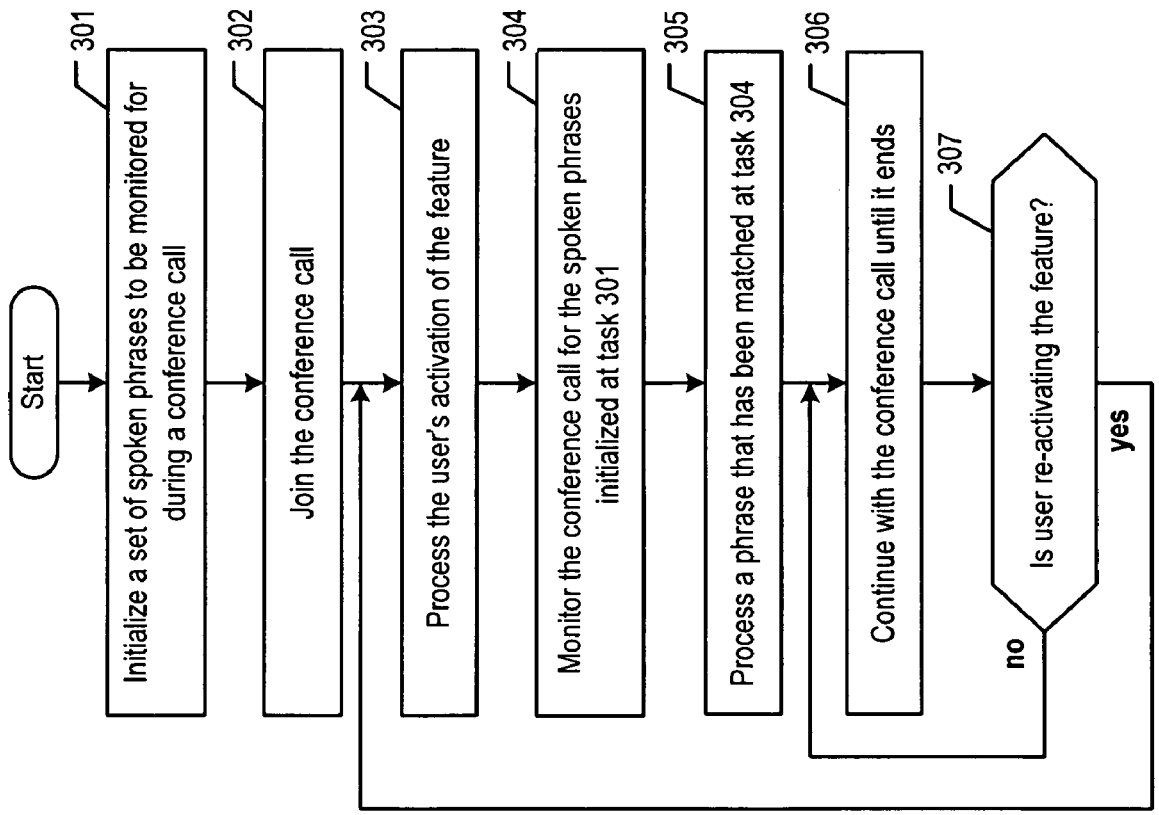
FIG. 3 depicts an overview of the tasks performed by endpoint 101-1, in monitoring a conference call on behalf of its user, as part of a first example of the illustrative embodiment.

In a first example that follows, endpoint 101-1 monitors a conference call on behalf of its own user, who is a participant of the conference call, while the user is temporarily distracted from the conference call. The user might be distracted while involved in a "parallel activity" to the conference call. For example, endpoint 101-1's user might have another activity going on in her office, which prevents her from giving her undivided attention to the call. The parallel activity might be related to or even in support of the call, or it might be unrelated to the call. Alternatively, the user might not have any parallel activity in mind, but instead might want to use the feature of the illustrative embodiment in order not to disrupt the call should she become distracted later FIG. 3 provides an overview of the tasks performed in the first example, with some of the tasks being described in additional detail with respect to FIGS. 4 through 7. At task 301 in FIG. 3, endpoint 101-1 initializes a set of spoken phrases to be monitored for during a conference call or some other type of teleconference in which at least the audio portion of the call is to be shared among the participants. One such spoken phrase might include the user's name. This task is invoked by the selection of a menu option at the endpoint, or it might be invoked through other means. Task 301 is described in detail with respect to FIG. 4.

At task 302, endpoint 101-1 joins the conference call in well-known fashion. Presumably, at least one other endpoint also participates on the call.

At task 303, endpoint 101-1 processes the activation of the monitoring and prompting feature of the illustrative embodiment. The feature activation occurs when the user of endpoint 101-1 indicates to the endpoint that it is to start the monitoring process, enabling the user to take care of her parallel activity. The indication can occur as the result of a menu selection, can occur automatically when the user mutes the endpoint's microphone, or can occur through some other means, as those who are skilled in the art will appreciate. Task 303 is described in detail with respect to FIG. 5.

At task 304, endpoint 101-1 monitors the conference call for the spoken phrases initialized at task 301. During this monitoring phase, endpoint 101-1 is acting on behalf of its user to determine whether the user should refocus on the conference call, such as when one of the other participants speaks the user's name or other key phrase. Task 304 is described in detail with respect to FIG. 6.

At task 305, endpoint 101-1 processes a phrase that has been matched at task 304, such as another participant having spoken the endpoint user's name. Task 305 is described in detail with respect to FIG. 7.

At task 306, endpoint 101-1 continues its participation in the conference call, maintaining its connection until the call is ended.

At task 307, if the monitoring and prompting feature is re-activated (e.g., by the user, etc.), task execution proceeds back to task 303. Otherwise, task execution proceeds back to task 306 to continue the call in well-known fashion.

Figure 4:
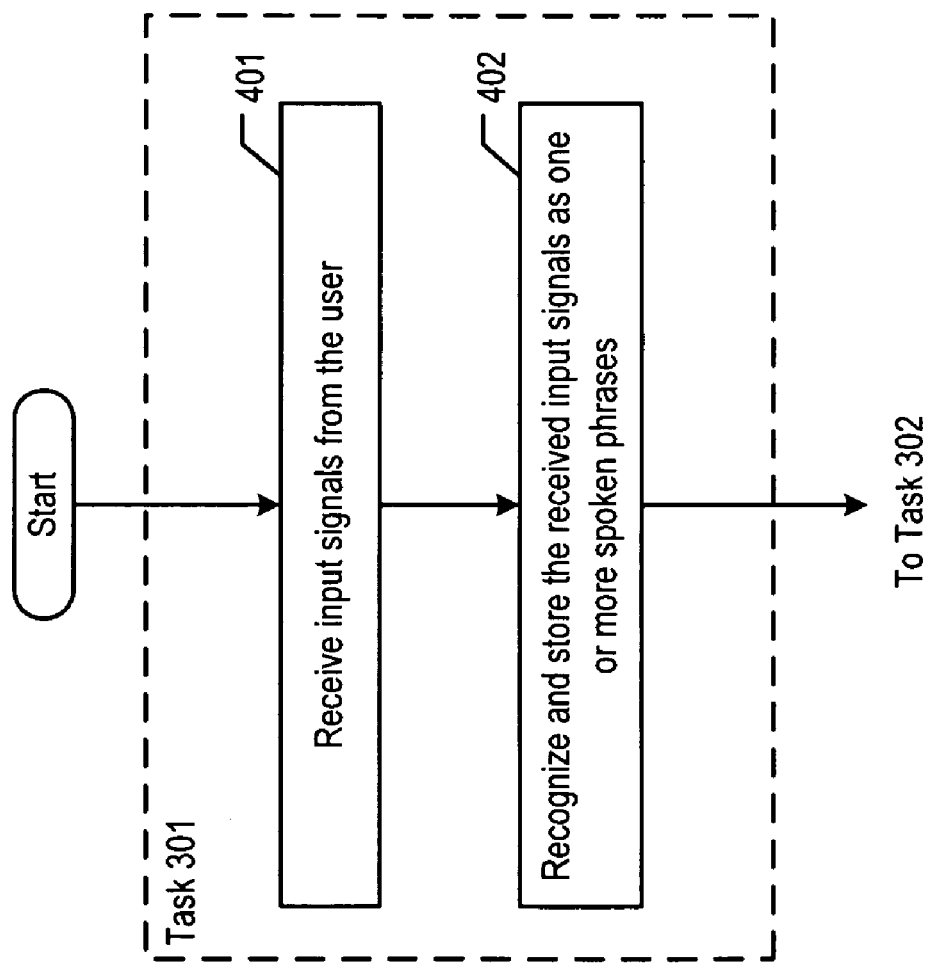
FIG. 4 depicts a flowchart of the salient tasks performed by telecommunications endpoint 101-1 in initializing a set of spoken phrases.

FIG. 4 depicts a flowchart of the salient tasks performed by telecommunications endpoint 101-1 in initializing a set of spoken phrases, as referred to earlier and with respect to task 301.

At task 401, endpoint 101-1 receives input signals from endpoint 101-1's user in well-known fashion. For example, the user can either speak audio signals into the microphone or enter information by using endpoint 101's keypad.

At task 402, endpoint 101-1 recognizes the received input signals as one or more spoken phrases in well-known fashion, and stores them into memory 204. For example, endpoint 101-1 might recognize and store what was spoken as a full phrase (e.g., "Karl, we need you", "Are you there, Jane", etc.), or it might recognize and store a subset of what was spoken (e.g., "Karl, "Jane", etc.), or both. As those who are skilled in the art will appreciate, any of a variety of voice-recognition techniques can be applied to perform the actions associated with task 402. After task 402, task execution proceeds to task 302.

Figure 5:
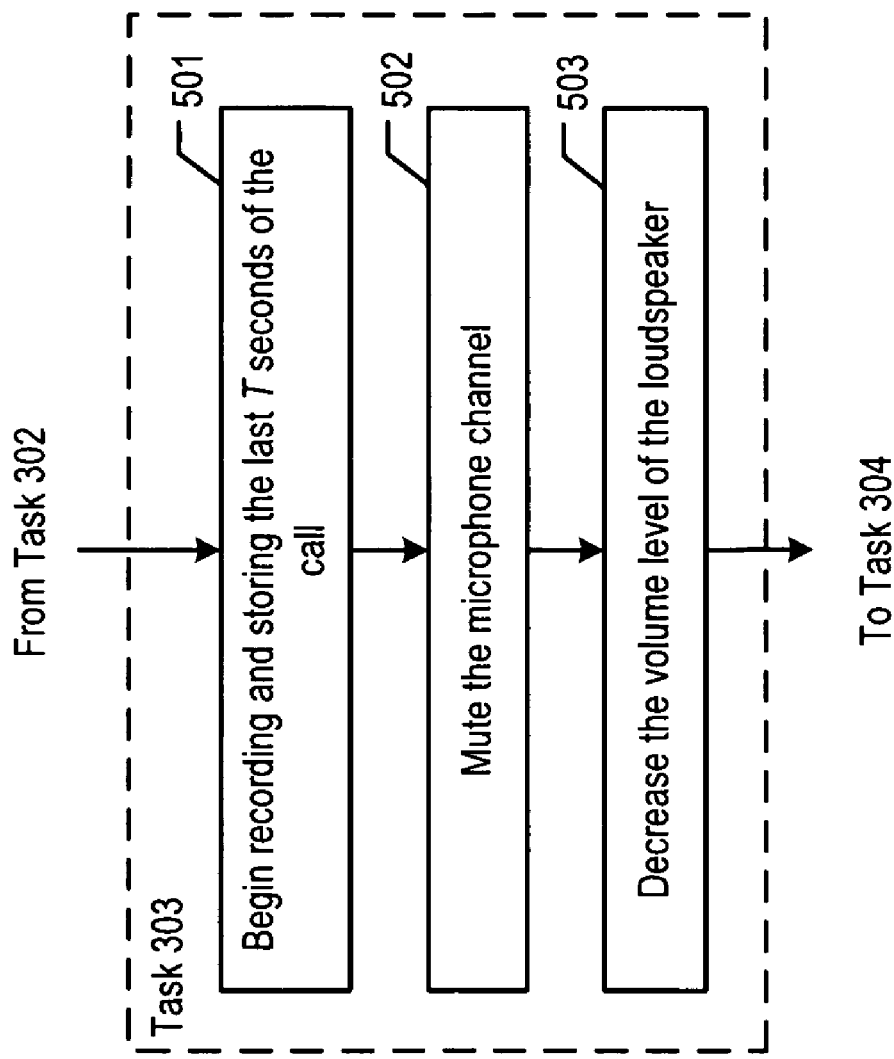
FIG. 5 depicts a flowchart of the salient tasks performed by telecommunications endpoint 101-1 in activating the monitoring and prompting feature of the illustrative embodiment.

FIG. 5 depicts a flowchart of the salient tasks performed by telecommunications endpoint 101-1 in processing the user's activation of the feature, as referred to earlier and with respect to task 303.

At task 501, endpoint 101-1 begins recording and storing the last T seconds (e.g., five seconds, etc.) of the conference call. In some embodiments, the endpoint user may select the value for T, depending on how much of the most recent part of the call the user will want to review when endpoint 101-1 prompts the user. In some alternative embodiments, endpoint 101-1 starts recording at least part of the call when the endpoint joins the call.

At task 502, endpoint 101-1 mutes its microphone. Muting is performed so that the rest of the participants on the conference call will not hear the user while she is involved in the parallel activity. In some alternative embodiments, endpoint 101-1 instead detects a muting of the microphone by endpoint 101-1's user, which in combination with the user having previously initialized spoken phrases (at task 301), indicates to the endpoint that the user is activating the monitoring and prompting feature of the illustrative embodiment.

At task 503, endpoint 101-1 decreases the volume level of its loudspeaker to a predetermined level, in order to enable the user to concentrate on the parallel activity. In some embodiments, the user previously established the value of the predetermined level. In some alternative embodiments, the user might have configured the feature not to decrease the volume level at all. After task 503, task execution proceeds to task 304.

Figure 6:
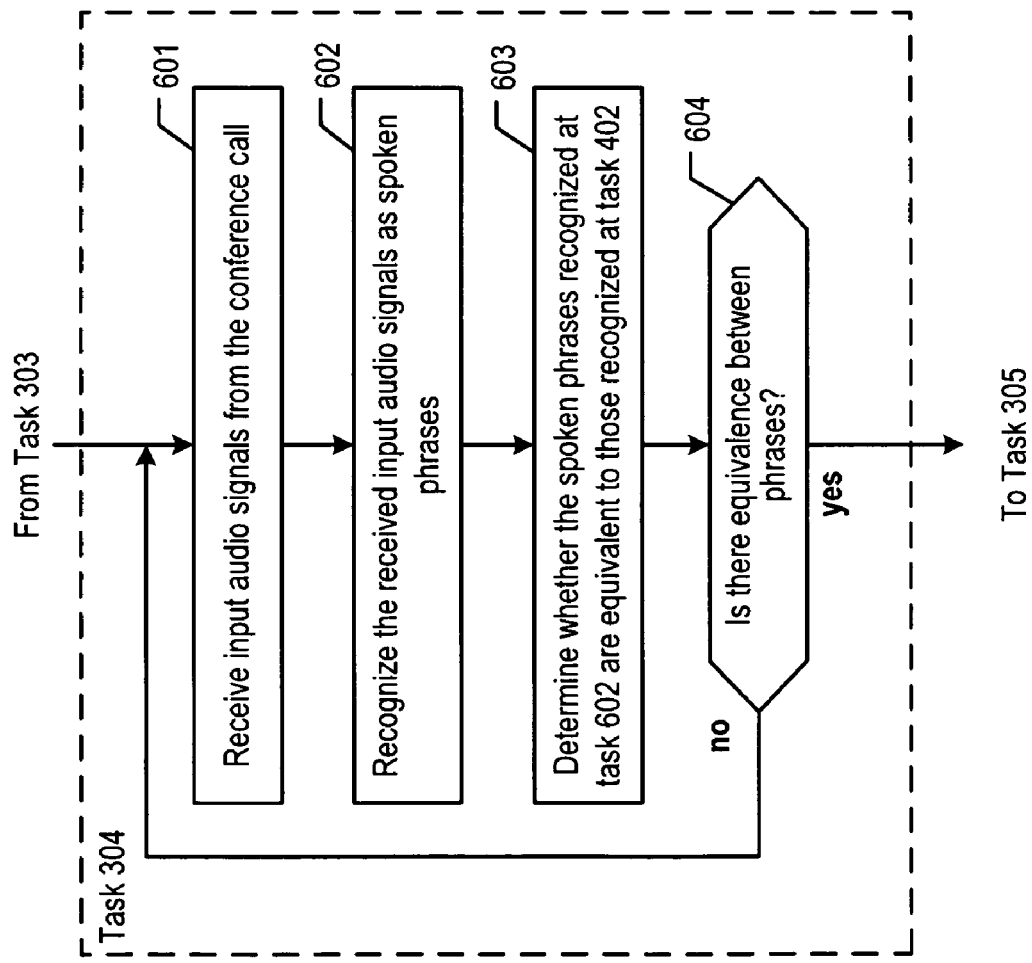
FIG. 6 depicts a flowchart of the salient tasks performed by telecommunications endpoint 101-1 in monitoring the conference call for the spoken phrases initialized previously.

FIG. 6 depicts a flowchart of the salient tasks performed by telecommunications endpoint 101-1 in monitoring the conference call for the spoken phrases initialized at task 301, as referred to earlier and with respect to task 304.

At task 601, endpoint 101-1 receives input audio signals from the other participants in the conference call. As described earlier and in well-known fashion, teleconference bridge 104 provides the appropriate mix of audio signals back to each endpoint, including endpoint 101-1.

At task 602, endpoint 101-1 recognizes the input audio signals as one or more spoken phrases. For example, endpoint 101-1 might recognize what was just spoken during the conference call as a full phrase (e.g., "Karl, we need you", "Are you there, Jane", etc.), or it might recognize individual words (e.g., "Karl, "Jane", etc.), or both. As those who are skilled in the art will appreciate, any of a variety of voice-recognition techniques can be applied to perform the actions associated with task 602.

At task 603, endpoint 101-1 determines whether the spoken phrases recognized at task 602 are equivalent to at least one of those recognized at task 402. A phrase spoken during the conference call is considered to be equivalent to a stored phrase when the two phrases are similar enough to be considered a match, from a voice-recognition algorithmic perspective. As with task 602, any of a variety of voice-recognition techniques can be applied to perform the actions associated with task 603, with respect to determining that a recently-spoken phrase matches, at least to some degree, a phrase that had been previously stored.

At task 604, if there is equivalence between phrases, task execution proceeds to task 305. Otherwise, task execution proceeds back to task 601 to continue the monitoring of the conference call.

Figure 7:
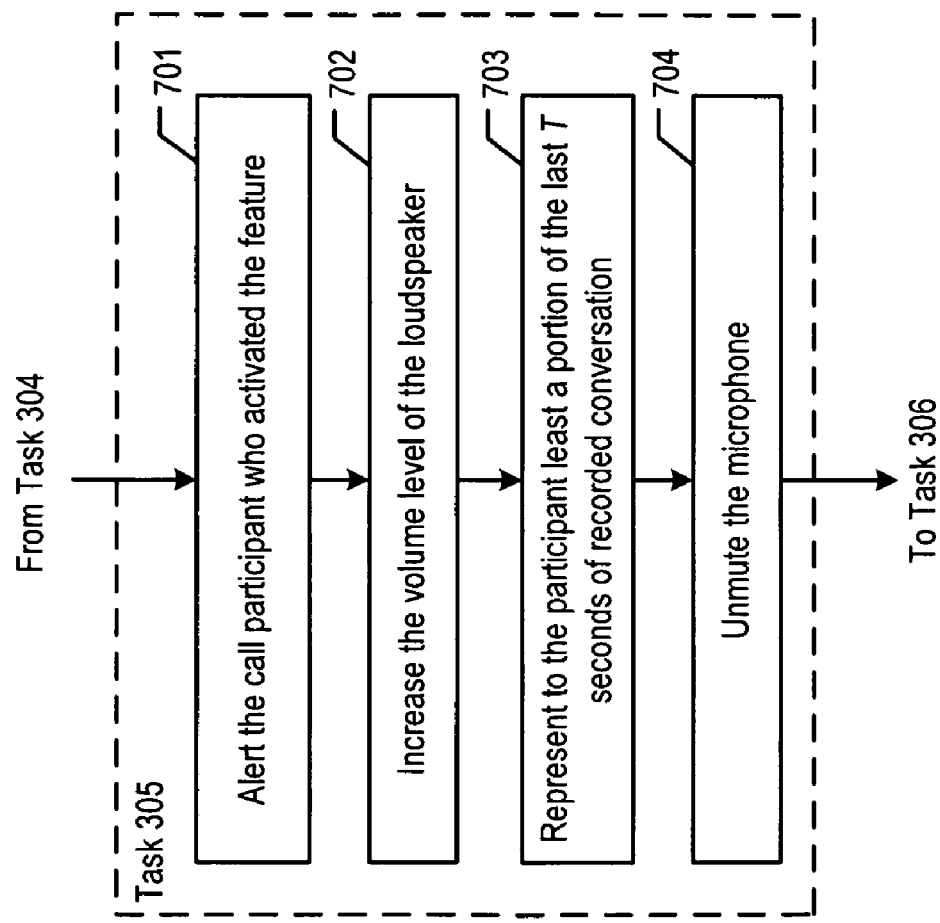
FIG. 7 depicts a flowchart of the salient tasks performed by endpoint 101-1 in processing a match between phrases.

FIG. 7 depicts a flowchart of the salient tasks performed by endpoint 101-1 in processing a match between phrases, as referred to above and with respect to task 305.

At task 701, endpoint 101-1 alerts its user that a match occurred. For example, endpoint 101-1 alerts its user by playing an audio prompt through the loudspeaker, in which the audio prompt indicates that a spoken phrase that had been recognized and stored at task 301 has just been spoken by a participant of the conference call.

In some embodiments, the audio prompt further comprises an indicium of the participant of the conference call who spoke the phrase. There are various techniques that can be used to determine the identity of the participant who spoke the phrase. For example, a more sophisticated voice-recognition algorithm can be implemented at endpoint 101-1 that is able to determine not only what is being said, but who is saying it. As another example, teleconference bridge 104 can i) detect who is speaking at any given moment, such as by monitoring the audio-signal energy at each of its input ports, ii) format the corresponding indicium, and iii) transmit it to endpoint 101-1, in the order described.

In some alternative embodiments, endpoint 101-1 alerts its user by displaying a textual or visual prompt on the endpoint's display, indicating that a stored phrase has just been spoken, as well as indicating the indicium of the person who spoke the phrase. In some other alternative embodiments, endpoint 101-1 alerts its user via another means, such as by actuating its vibration mechanism.

At task 702, endpoint 101-1 increases the volume level of the loudspeaker if it had been decreased back at task 503.

At task 703, endpoint 101-1 represents to the alerted user at least a portion of the last T seconds of recorded conversation, so that the user can quickly review the context of why she is needed on the call. This amounts to playing back the portion of recorded conversation through the loudspeaker. In some embodiments, endpoint 101-1 converts the portion of recorded conversation to text, in well-known fashion, and then displays it for the user to read.

At task 704, endpoint 101-1 unmutes the microphone if it had been muted previously. At this point, the user has acquired some context of the recent portion of the call, as enabled by task 703, and is able to verbally respond to what had been spoken on the call.

Task execution then proceeds to task 306, where endpoint 101-1 continues its participation in the conference call.

Figure 8:
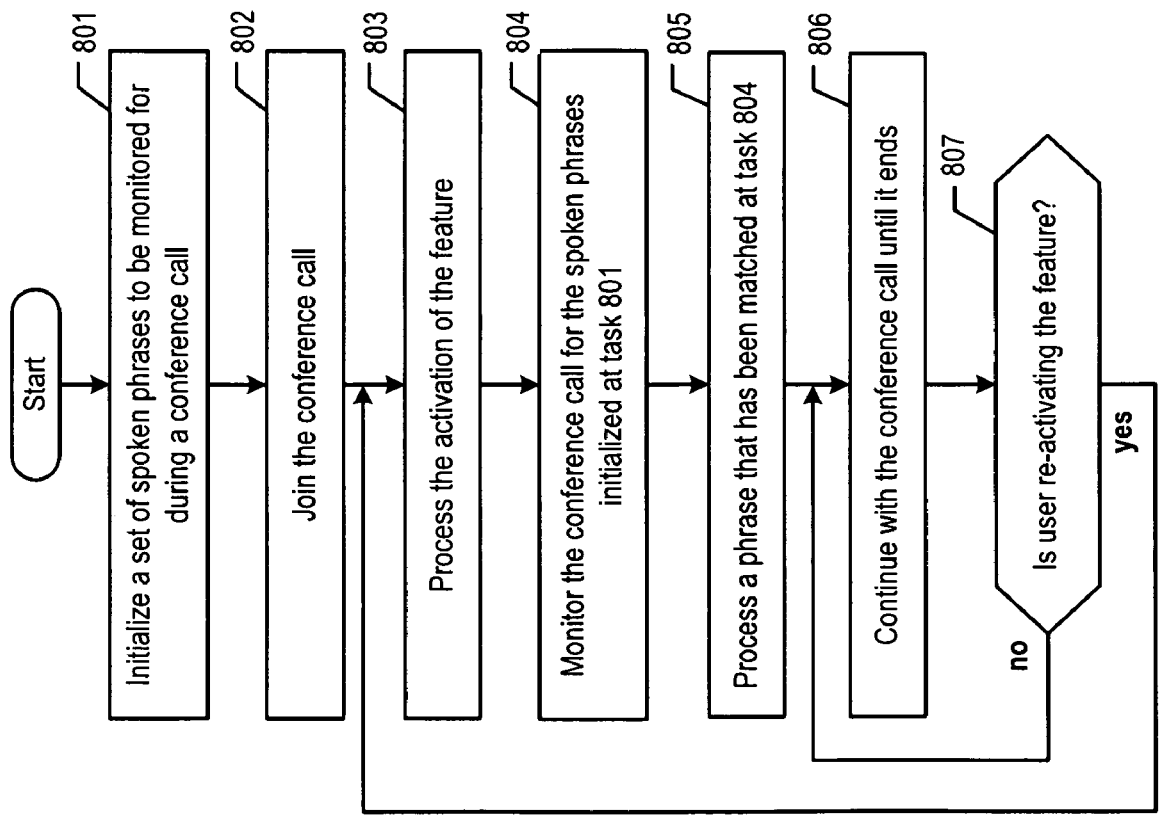
FIG. 8 depicts an overview of the tasks performed by endpoint 101-1, in monitoring a conference call on behalf of a different endpoint's user, as part of another example of the illustrative embodiment.

In a second example of the illustrative embodiment, endpoint 101-1 monitors a conference call on behalf of a remote participant, instead of the endpoint's own user, while the remote participant is temporarily distracted from the call. The remote participant might have joined the call using endpoint 101-2, which in this example is a cell phone in the prior art that is incapable of performing the tasks of the illustrative embodiment. Subsequent to joining the call, the remote participant placed the prior-art cell phone in speakerphone mode and then put the phone down to take care of another matter. FIG. 8 summarizes the salient tasks that are executed as part of this second example and follows the overall flow of FIG. 3, if not the specific tasks executed.

At task 801, endpoint 101-1 initializes a set of spoken phrases to be monitored for during a conference call. For example, similar to what is described above and with respect to FIG. 4, endpoint 101-1's user either speaks audio signals on behalf of endpoint 101-2's user or endpoint 101-1's user configures her endpoint to be able to then accept audio signals from endpoint 101-2's user. Endpoint 101-1 then recognizes the input signals as one or more spoken phrases and stores them for later use.

At task 802, endpoint 101-1 joins the conference call in well-known fashion. Presumably at least one other participating endpoint also joins the call, including endpoint 101-2.

At task 803, endpoint 101-1 processes the user's activation of the feature of the illustrative embodiment. This task comprises at least some of the subtasks described above and with respect to FIG. 5. For example, endpoint 101-1 begins recording and storing the last T seconds of the call, the audio portion to be used later. In some embodiments, endpoint 101-1 transmits a control signal to endpoint 101-2 that mutes endpoint 101-2's microphone and/or decreases the volume level of that endpoint's loudspeaker.

At task 804, endpoint 101-1 monitors the conference call, on behalf of endpoint 101-2's user, for the spoken phrases initialized at task 801. Task 804 is described in detail with respect to FIG. 6.

At task 805, endpoint 101-1 processes a phrase that was matched at task 804. For example, similar to what is described above and with respect to FIG. 7, endpoint 101-1 alerts endpoint 101-2's user by transmitting a message to endpoint 101-2, such as a text message, in which the message indicates that a spoken phrase that had been recognized and stored at task 801 has just been spoken by a participant of the conference call. In some embodiments, the message further comprises an indicium of the participant of the conference call who spoke the phrase. In some other embodiments, the message comprises a prompt to endpoint 101-2's user to unmute his/her endpoint's microphone.

At task 806, endpoint 101-1 continues its participation in the conference call, maintaining its connection until the call is ended.

At task 807, if the feature is re-activated, such as by one of the users, task execution proceeds back to task 803. Otherwise, task execution proceeds back to task 806 to continue the call in well-known fashion.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A telecommunications endpoint that is used by a first participant in a conference call, the telecommunications endpoint comprising:
   a microphone configured to receive a first input audio signal from the first participant;
   a network interface configured to receive a second input audio signal from a second participant of the conference call at a second telecommunications endpoint;
   a processor configured:
      to recognize the first input audio signal as a first spoken phrase;
      to recognize the second input audio signal as a second spoken phrase;
      to determine whether the second spoken phrase is equivalent to the first spoken phrase; and
      to automatically decrease the volume level of a loudspeaker at the telecommunications endpoint in response to i) the processor recognizes the first input audio signal and ii) the processor detects that the microphone has been muted;
   a memory configured to store: i) the first spoken phrase; and ii) the latest T seconds of audio associated with the conference call, wherein T is a real number greater than zero, wherein the processor is also playing back at least a portion of the latest T seconds of audio when the processor determines that the second spoken phrase is equivalent to the first spoken phrase; and
   alerting means configured to alert one of the participants in the conference call other than the second participant, when the processor determines that the second spoken phrase is equivalent to the first spoken phrase, wherein the alerting means comprises a display at the telecommunications endpoint;
   wherein:
      the processor is user-configurable not to decrease a volume level of a loudspeaker prior to when the processor determines that the second spoken phrase is equivalent to the first spoken phrase; and
      if the processor has been configured to decrease the volume level prior to when the processor determines that the second spoken phrase is equivalent to the first spoken phrase, then the processor is further configured to increase the volume level of the loudspeaker when the processor determines that the second spoken phrase is equivalent to the first spoken phrase.

2. The telecommunications endpoint of claim 1 wherein the alerting means further comprises a loudspeaker at the telecommunications endpoint, and wherein the alerting means is configured to alert the first participant.

3. The telecommunications endpoint of claim 2 wherein the processor is further configured to unmute the microphone when the processor determines that the second spoken phrase is equivalent to the first spoken phrase.

4. The telecommunications endpoint of claim 1 wherein the alerting means is the network interface transmitting a text message to a third participant in the conference call at a third telecommunications endpoint.

5. A method for alerting a first participant in a conference call, the method comprising:
   receiving, at a first telecommunications endpoint, i) a first input audio signal from the first participant at the first telecommunications endpoint and ii) a second input audio signal from a second participant of the conference call at a second telecommunications endpoint;
   recognizing i) the first input audio signal as a first spoken phrase and ii) the second input audio signal as a second spoken phrase;
   determining whether the second spoken phrase is equivalent to the first spoken phrase;
   detecting whether a microphone has been muted;
   automatically decreasing a volume level of a loudspeaker at the telecommunications endpoint in response to the step of recognizing the first input audio signal and the step of detecting whether the microphone has been muted;
   storing: i) the first spoken phrase; and ii) the latest T seconds of audio associated with the conference call, wherein T is a real number greater than zero, wherein a processor is also playing back at least a portion of the latest T seconds of audio when the processor determines that the second spoken phrase is equivalent to the first spoken phrase; and
   when the second spoken phrase is determined to be equivalent to the first spoken phrase, alerting the first participant by use of a display at the first telecommunications endpoint and identifying, to the first speaker, the second speaker as the speaker of the spoken phrase that is equivalent to the first spoken phrase,
   wherein:
      the processor is user-configurable not to decrease a volume level of a loudspeaker prior to when the processor determines that the second spoken phrase is equivalent to the first spoken phrase; and
      if the processor has been configured to decrease the volume level prior to when the processor determines that the second spoken phrase is equivalent to the first spoken phrase, then the processor is further configured to increase the volume level of the loudspeaker when the processor determines that the second spoken phrase is equivalent to the first spoken phrase.

6. The method of claim 5 wherein the alerting comprises presenting an indication that a phrase equivalent to the first spoken phrase has been spoken by a participant of the conference call other than the first participant.

7. The method of claim 6 further comprising unmuting the microphone when the second spoken phrase is determined to be equivalent to the first spoken phrase.

8. The method of claim 5 further comprising decreasing the volume level of a loudspeaker at the first telecommunications endpoint based on the first input audio signal having been recognized.

9. The method of claim 5 further comprising muting a microphone at the first telecommunications endpoint based on the first input audio signal having been recognized.

10. A method for alerting a remote participant in a conference call, the method comprising:

receiving, at a first telecommunications endpoint, i) a first input audio signal from a first participant at the first telecommunications endpoint and ii) a second input audio signal from a second participant of the conference call at a second telecommunications endpoint;

recognizing i) the first input audio signal as a first spoken phrase and ii) the second input audio signal as a second spoken phrase, wherein the first spoken phrase is meaningful as a cue for the remote user to focus on the conference call;

determining whether the second spoken phrase is equivalent to the first spoken phrase;

detecting whether a microphone has been muted;

automatically decreasing a volume level of a loudspeaker at the telecommunications endpoint in response to the step of recognizing the first input audio signal and the step of detecting whether the microphone has been muted;

storing: i) the first spoken phrase; and ii) the latest T seconds of audio associated with the conference call, wherein T is a real number greater than zero, wherein a processor is also playing back at least a portion of the latest T seconds of audio when the processor determines that the second spoken phrase is equivalent to the first spoken phrase; and when the second spoken phrase is determined to be equivalent to the first spoken phrase, transmitting a message to the remote call participant by use of a display, wherein the message identifies the second speaker as the speaker of a spoken phrase that is equivalent to the first spoken phrase, wherein:

the processor is user-configurable not to decrease a volume level of a loudspeaker prior to when the processor determines that the second spoken phrase is equivalent to the first spoken phrase; and if the processor has been configured to decrease the volume level prior to when the processor determines that the second spoken phrase is equivalent to the first spoken phrase, then the processor is further configured to increase the volume level of the loudspeaker when the processor determines that the second spoken phrase is equivalent to the first spoken phrase.

11. The method of claim 10 wherein the message comprises an indication to the remote participant that a phrase equivalent to the spoken phrase has been spoken by a participant of the conference call.

12. The method of claim 11 wherein the message is a text message.

13. The method of claim 11 wherein the message comprises a prompt to the remote call participant to unmute the microphone of his/her telecommunications endpoint.

* * * * *